Dec. 11, 1951   R. M. NARDONE   2,578,443
PRESSURE GAS GENERATION CONTROL
Filed Feb. 10, 1948
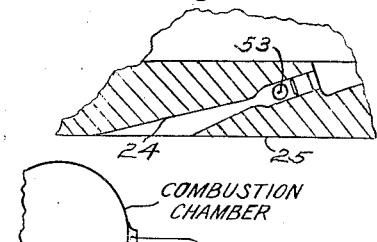
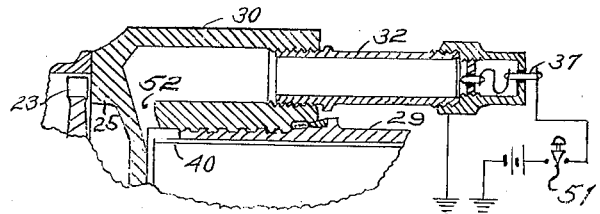
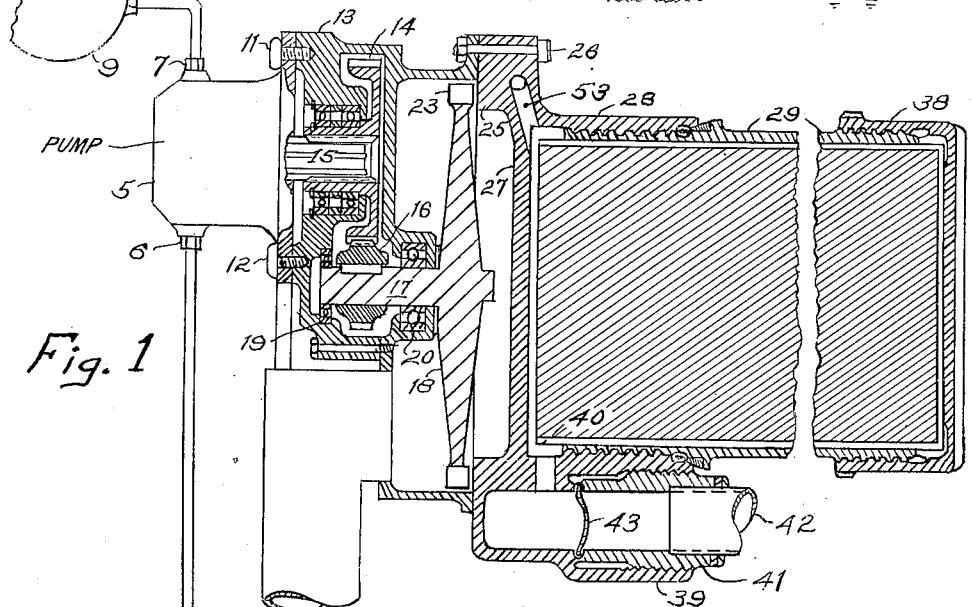
INVENTOR.
ROMEO M. NARDONE
BY Martin J. Finnegan
ATTORNEY

Patented Dec. 11, 1951

2,578,443

UNITED STATES PATENT OFFICE 2,578,443

PRESSURE GAS GENERATION CONTROL

Romeo Morton Nardone, Teaneck, N. J., assignor to Joseph J. Mascuch, Maplewood, N. J.

Application February 10, 1948, Serial No. 7,472

2 Claims. (Cl. 60—39.1)

This invention relates to fuel supply systems, and particularly to the delivery of liquid fuel to the combustion chamber of a rocket motor or other engine having a high fuel consumption capacity but a relatively brief operating span.

For such requirements it is desirable to have fuel pumping mechanism that can be accelerated to a high speed very rapidly, and maintained at such high speed throughout its brief operating cycle. An object of the present invention is to provide such a fuel pump, together with driving means capable of operating the pump at high speed for the required length of time.

Another object is to provide a fluid drive in the form of a turbine mounted adjacent the pump to be driven, and energized by high pressure gases generated by the progressive combustion of a quantity of solid nitrogenous material of the "slow-burning" type, so-called.

A third object is to provide a novel structural relationship between a solid propellant type of gas generator and a gas-driven turbine, said relationship including nozzle means for converting the high gas pressure to high velocity energy just prior to its application to the turbine.

These and other objects of the invention will be understood upon reading of the following description, with reference to the accompanying drawing illustrating one embodiment of the invention. Other embodiments are, of course, embraced in the appended claims.

In the drawing:

Fig. 1 is a sectional view of the main assembly, including fuel pump, driving turbine, and main powder chamber;

Fig. 2 shows the igniting unit in its relation to the main powder chamber;

Fig. 3 is a sectional view through one of the nozzles, on a scale somewhat larger than that of Figs. 1 and 2;

Fig. 4 shows the emergency pressure booster in its relation to the main powder chamber, and Fig. 5 is a sectional view showing the relationship of the cylinders 30, 31 and 39 with the chamber 29.

Reference numeral 5 designates the housing of a pump having inlet and outlet connections 6, 7, respectively, the former being in communication with a fuel supply tank 8 and the latter with the combustion chamber 9 of a short cycle engine such as a rocket motor. Screws 11, 12 secure the flanged pump housing to a gear housing 13 containing a gear 14 whose hub is splined to the projecting extension 15 of the central driving assembly of the pump. Rotative effort is applied to this pump shaft 15 by way of a pinion 16 keyed to the extended hub 17 of a turbine wheel 18; the hub 17 being journaled in bearings 19 and 20 carried by the gear housing, and the pinion 16 being in mesh with the gear 14 to transmit to the pump 5 the energy supplied by the rotation of turbine 18.

Buckets 23 around the periphery of turbine 18 are in lateral alignment with a series of nozzles 24 formed in a nozzle ring 25 secured to the gear housing 13 by bolts 26. This nozzle ring is part of a unitary receiving element 27 having four cylindrical sockets as follows: a large central socket 28 to which is screwed the main powder housing 29, and three smaller sockets 30, 31 and 39, the former receiving the igniting cartridge barrel 32 and the socket 31 receiving the tube 33 to which connects the emergency pressure boosting cartridge container 34 (Fig. 4). A terminal post 35 is secured to the outer end of the container 34, in electrical contact with an ignition electrode forming part of an electric circuit leading from a current source 36, and a similar terminal connector 37 is part of an electric circuit for the firing of the cartridge in container 32. A cap 38 closes the cylinder 29, after insertion therein of the main powder "stick" 40.

The third small socket is shown at 39 in Fig. 1, and is internally threaded to receive a fitting 41 to which is connected an emergency exhaust conduit 42; the normal exhaust conduit being shown at 45. Fitting 41 also serves to hold in place a rupturable disc 43, and a second rupturable disc 44 is held in place in socket 31 by a similar fitting 46.

Tank 8 includes a float element 48 on one end of a lever whose other end carries a contact element 49 engageable with a complementary contact element 50 to complete a circuit from source 36 to the cartridge in container 34, if the fuel in tank 8 should be completely used up.

To begin the cycle, the operator closes switch 51 (Fig. 2) to electrically ignite the cartridge in container 32, whereupon the constituent powder grains move out through the conduit 52 and into contact with the forward face of the solid powder cylinder 40. The heat of the burning powder grains ignite the main powder stick 40, and the latter then burns progressively from front to back. Meanwhile, the hot gases evolved in the burning process pass to the nozzles 24 (one of which is shown in Fig. 3) by way of passages 53, and these nozzles convert the kinetic heat energy of the gases into high velocity streams impinging upon vanes 23 and thereby imparting high rotative speed to the turbine wheel 18. Thus rotation is transmitted to pump 5 by way of gears 16 and 14. Thus motor 9 receives liquid fuel from supply tank 8.

After passing beyond the buckets 40, the spent gases emerge to the atmosphere by way of exhaust conduit 45.

Should the pressure generated by the burning powder rise beyond the predetermined safe value, disc 43 will burst and permit release of the gases to the atmosphere through emergency exhaust pipe 42.

In the event of complete exhaustion of the fuel supply in tank 8, switch 49, 50 will close to cause ignition of the powder in emergency pressure booster unit 34. The resultant pressure increase will burst the discs 44 and 43 in sequence, thus relieving the pressure at the turbine nozzles and preventing over-speeding of the wheel 18.

I claim:

1. A pressure gas generation system comprising a main gas generating unit, a normal outlet port for feeding gas from said main unit to a part to be rotated, an emergency exhaust conduit, a rupturable disc normally sealing said emergency exhaust conduit, and means for boosting the pressure beyond that normally prevailing in said main unit, said pressure boosting means including an auxiliary gas generating unit adjacent said emergency exhaust conduit, and a second rupturable disc normally preventing communication between said two gas generators.

2. Apparatus as defined in claim 1, including electrical means for controlling the generation of gas pressure in said auxiliary unit of sufficient magnitude to burst both said discs and thereby relieve the pressures developed in both gas generators.

ROMEO MORTON NARDONE.

REFERENCES CITED

The following references are of record in the file of this patent:

UNITED STATES PATENTS

| Number | Name | Date |
| --- | --- | --- |
| 1,884,479 | Woolson | Oct. 25, 1932 |
| 2,395,113 | Goddard | Feb. 19, 1946 |
| 2,397,659 | Goddard | Apr. 2, 1946 |
| 2,400,242 | Malina et al. | May 14, 1946 |
| 2,447,200 | Miller | Aug. 17, 1948 |